United States Patent
Hsiao et al.

(10) Patent No.: US 9,559,609 B2
(45) Date of Patent: Jan. 31, 2017

(54) INTEGRATED POWER-CONVERTING MODULE

(71) Applicant: Chicony Power Technology Co., Ltd., New Taipei (TW)

(72) Inventors: Yung-Hung Hsiao, New Taipei (TW); Hao-Te Hsu, New Taipei (TW); Chi-Chang Ho, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 152 days.

(21) Appl. No.: 14/694,949

(22) Filed: Apr. 23, 2015

(65) Prior Publication Data

US 2016/0315555 A1  Oct. 27, 2016

(51) Int. Cl.
| | |
|---|---|
| *H02K 11/00* | (2016.01) |
| *H02M 7/08* | (2006.01) |
| *H02M 1/14* | (2006.01) |
| *H02M 7/00* | (2006.01) |

(52) U.S. Cl.
CPC ............... *H02M 7/08* (2013.01); *H02M 1/14* (2013.01); *H02M 7/003* (2013.01)

(58) Field of Classification Search
CPC ........ H02K 11/33; H02K 5/225; H02K 11/048
USPC ............. 310/71, 68 R, 68 D, 194, 201, 208; 363/125–126, 7, 15, 34, 21.06
See application file for complete search history.

(56) References Cited

U.S. PATENT DOCUMENTS

| | | | | |
|---|---|---|---|---|
| 5,576,941 A * | 11/1996 | Nguyen | ............... | H02J 9/062 363/133 |
| 6,118,362 A * | 9/2000 | Tinkler | ............... | H01F 27/06 336/170 |
| 6,972,657 B1 * | 12/2005 | Pacala | ............... | H01F 27/2866 336/200 |
| 2002/0008980 A1 * | 1/2002 | Gekinozu | ........... | H02M 3/3385 363/97 |
| 2005/0083665 A1 * | 4/2005 | Nakashima | ........... | H02M 7/003 361/767 |
| 2005/0231036 A1 * | 10/2005 | No | ........................ | H04B 3/54 307/1 |
| 2007/0195560 A1 * | 8/2007 | Yasumura | ............... | G05F 1/70 363/21.01 |
| 2010/0328974 A1 * | 12/2010 | Kenny | ............... | H02M 3/3376 363/126 |
| 2012/0281445 A1 * | 11/2012 | Moriya | ............... | H01F 27/40 363/61 |

* cited by examiner

*Primary Examiner* — Thanh Lam
(74) *Attorney, Agent, or Firm* — Chun-Ming Shih; HDLS IPR Services

(57) ABSTRACT

An integrated power-converting module includes a bobbin, a primary coil, a magnetic core assembly, and a plurality of power-converting units. The bobbin includes a main body, a plurality of winding portions and a plurality of receiving portions, and the winding portions and the and the receiving portion are arranged in a staggered manner. The primary coil is wound on the winding portions and the magnetic core assembly is assembled with the bobbin. Each power-converting unit includes a circuit board, a rectifier, and a filter, the rectifier and the filter are placed on a base portion of the circuit board and electrically connected thereto. An extending portion of the circuit board connect to the base portion is inserted into a slot formed within the receiving portion, and a penetrating hole formed on the extending portion is aligned with and communicated with a first channel formed on the main body.

10 Claims, 6 Drawing Sheets

INTEGRATED POWER-CONVERTING MODULE

BACKGROUND OF THE INVENTION

Field of the Invention

The present disclosure relates to a power-converting module. More particularly, the present disclosure relates to an integrated power-converting module.

Description of Related Art

Electric power is used in almost all electronic devices, and it is the core and can affect performance thereof.

The demands for electric power follow the trend towards downsizing, high efficiency, and lower cost as energy saving and carbon reduction keeps promoting. A conventional power converter includes a flat circuit board, at least one transformer, and a plurality of electrical components, and the converter and the electrical components are individually placed on the circuit board for electrically connecting each other via traces formed on the circuit board. In such manner, the transformer and electrical components occupy a lot of space in the circuit board, this becomes the main obstacle of the high power converter to achieve miniaturization. Therefore, there is a need of providing an integrated power-converter in order to obviate the drawbacks encountered in the prior art.

SUMMARY OF THE INVENTION

According to one aspect of the present invention, an integrated power-converting module electrically connected to a direct current (DC) electric power includes a bobbin, at least one primary coil, a magnetic core assembly, and a plurality of power-converting units. The bobbin includes a main body, a plurality of winding portions, and a plurality of receiving portions. The main body includes a channel, and the winding portions and the receiving portions are respectively connected to the main body and arranged in a stagger manner. Each of the receiving portions has a slot communicating with the first channel. The primary winding is wound on the winding portions. The magnetic core assembly is assembled with the bobbin and partially received in the first channel.

The power-converting units are arranged in a parallel manner, and each of the power-converting units includes a circuit board, a rectifier, and a filter. The circuit board has a base portion and an extending portion connected to the base portion and including a penetrating hole. When the extending portion is inserted into the slot, the penetrating hole is aligned with the first channel and communicating therewith. The circuit board has two opposite surfaces, the rectifier is placed on one of the surfaces and electrically connected to the circuit board, and the filter is placed on the other surface of the circuit board and electrically connected to the rectifier.

When the DC electric power is conducted to the integrated power-converting module, the magnetic core assembly generates electromagnetic induction with the primary coil and the copper foils or electrically conductive sheets placed on the extending portions of the circuit boards, so that the copper foils or electrically conductive sheets respectively generate an outputting voltage.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

A preferred embodiment of the present invention will be described with reference to the drawings.

Figure 1:
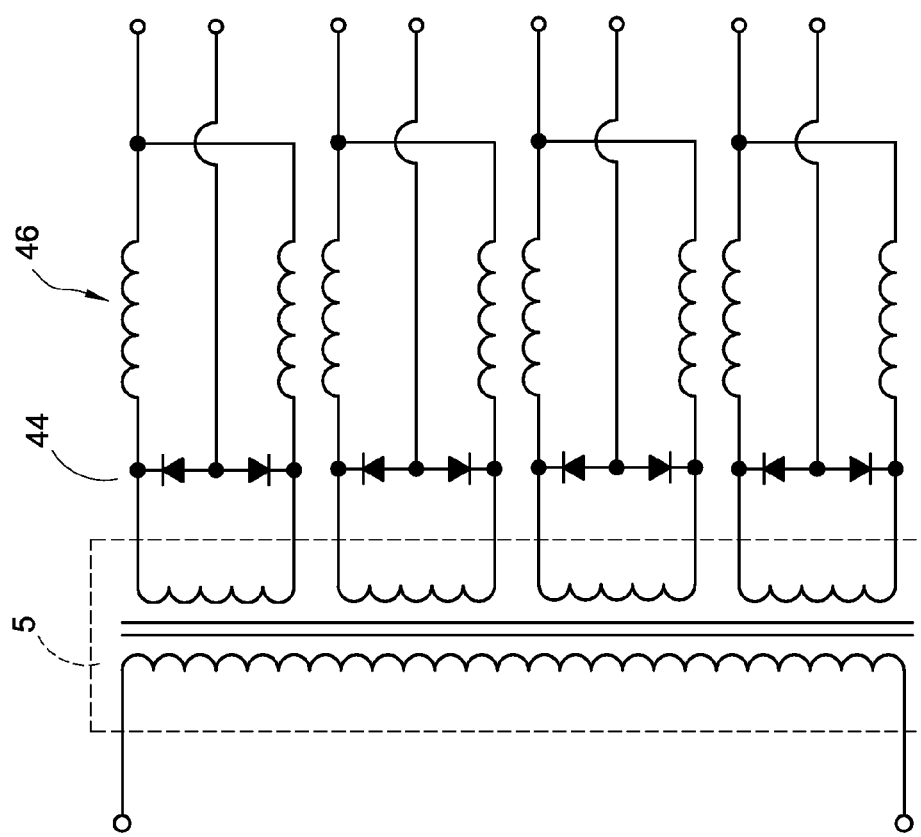
FIG. 1 is a circuit diagram of an integrated power-converting module according to the present invention.

Reference is made to FIG. 1, which is a circuit diagram of an integrated power-converting module according to the present invention. The integrated power-converting module having functions of changing voltage, rectification, and filtration, and includes a transformer 5, a plurality of rectifiers 44, and a plurality of filter 46. The rectifier 44 and the filters 46 are electrically connected to a secondary side of the transformer 5. The rectifier 44 receives the converted electric power outputted from the secondary side of the transformer 5 and converts the converted electric power from alternative current (AC), which periodically reverse direction, to direct current (DC), which flow in only one direction. The filter 46 is configured to remove the unwanted AC components (or called ripple) of the rectifier 44 output, thus the integrated power-converting module can output a smooth and steady DC.

Figure 2:
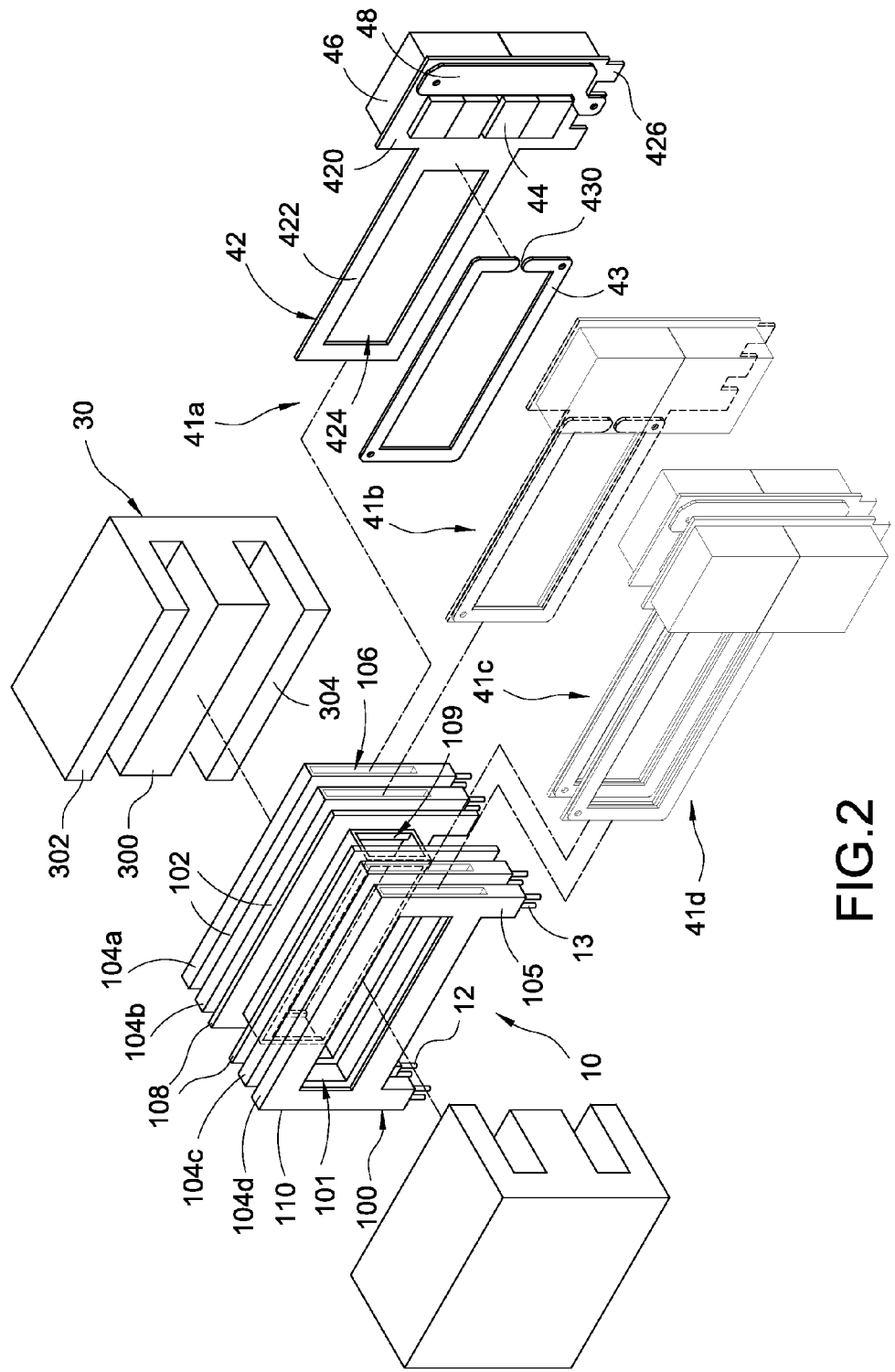
FIG. 2 is an exploded view of the integrated power-converting module according to the present invention.
Figure 3:
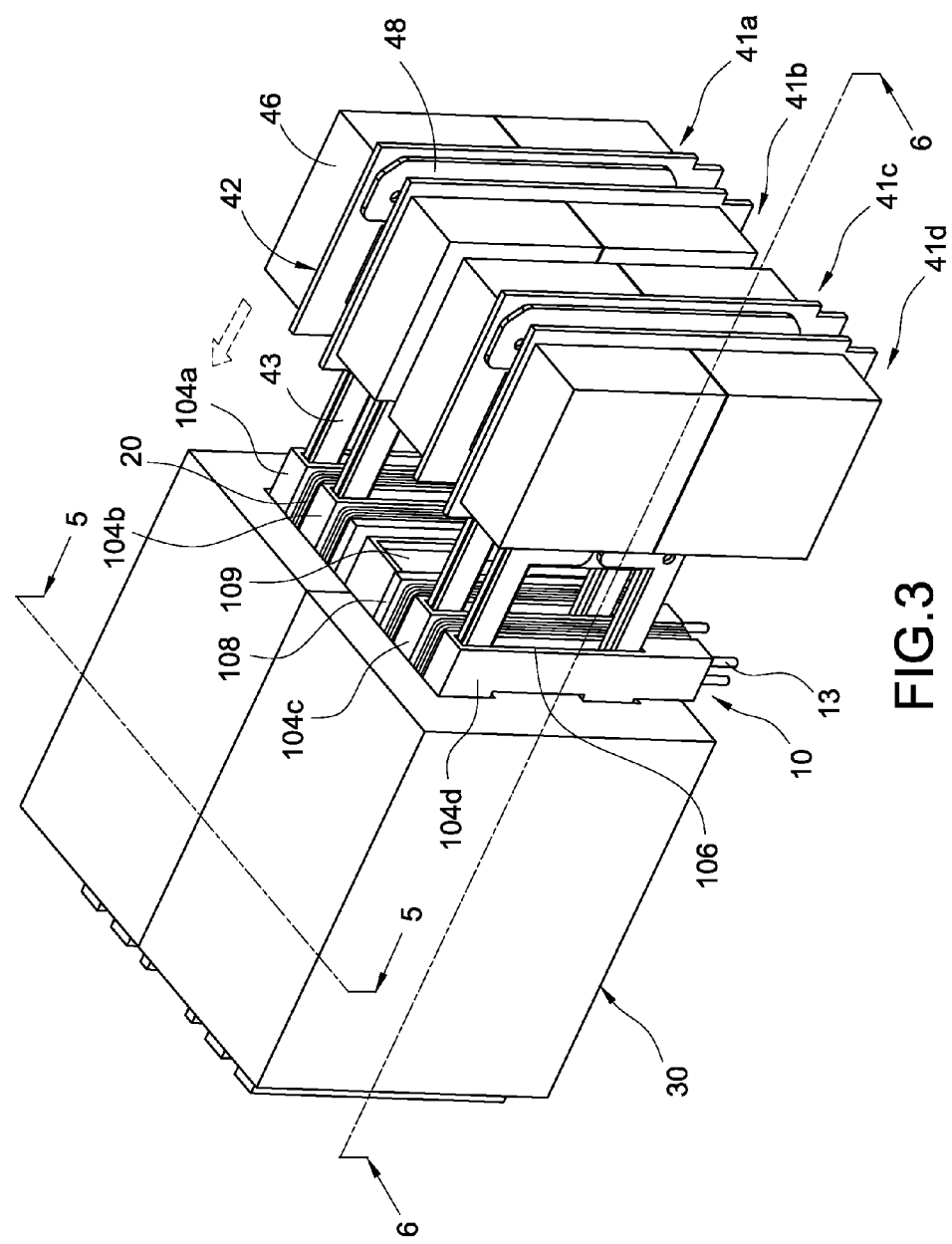
FIG. 3 is a partially assembled view of the integrated power-converting module according to the present invention.
Figure 4:
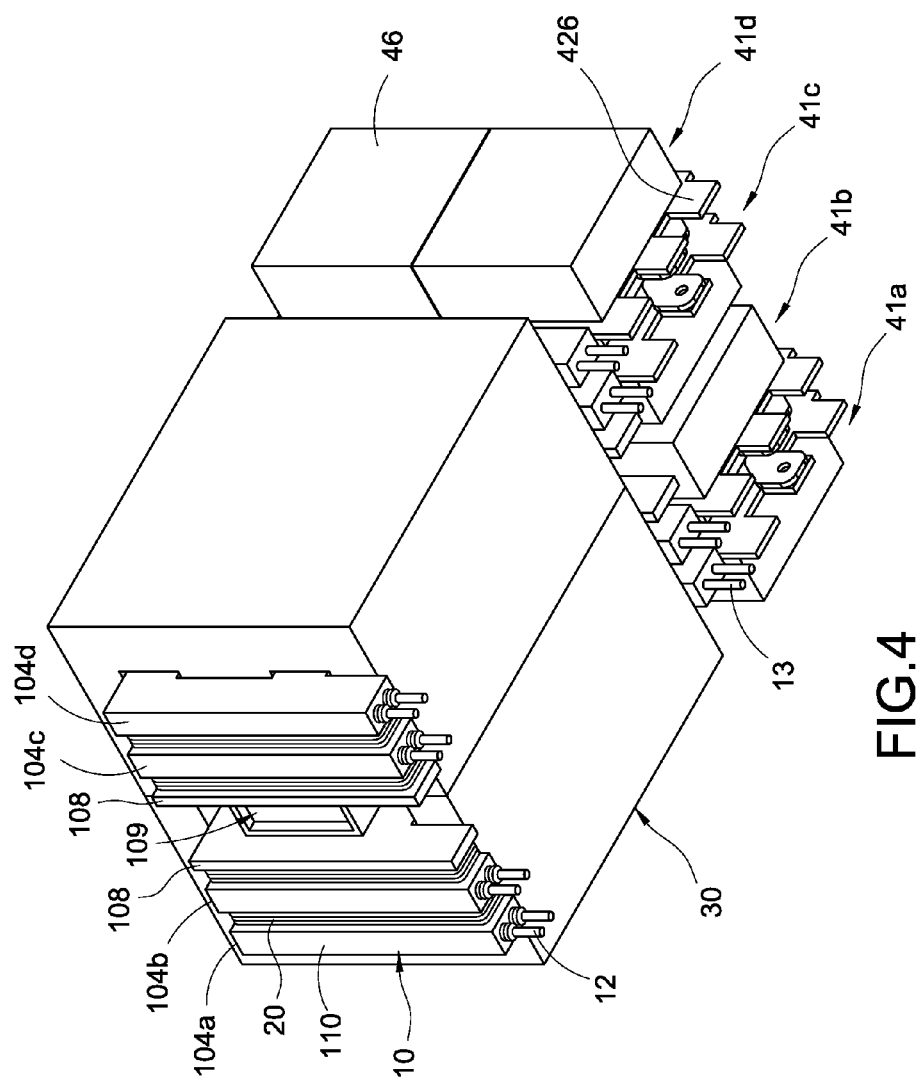
FIG. 4 is an assembled view of the integrated power-converting module according to the present invention.

Reference is made to FIG. 2 and FIG. 3, which are respectively an exploded view and an assembled view of the integrated power-converting module according to the present invention. The integrated power-converting module includes a bobbin 10, at least one primary coil 20, a magnetic core assembly 30, and a plurality of power-converting units 41a~41d.

The bobbin 10 includes a main body 100, a plurality of winding portions 102, and a plurality of receiving portions 104a~104d. The main body 100 includes a first channel 101. The amount of the receiving portions 104a~104b is the same as that of the winding portions 102. The receiving portions 104a~104d are arranged in a parallel manner, and the winding portions 102 and the receiving portions 104a~104d are arranged in a stagger manner.

The main body 100 further includes a second channel 109 communicating with the first channel 101 and substantially perpendicular thereto.

The bobbin 10 of the present invention includes four receiving portions 104a~104d arranged at two opposite sides of the second channel 109. In particular, the receiving portions 104a and 104b are arranged at one side of the second channel 109, and the receiving portions 104c and 104d are arranged at the other side thereof. The winding portions 102 also arranged at the opposite sides of the second channel 109, and the winding portions 102 and the receiving portions 104a~104d are arranged in staggered manner.

Each of the receiving portions 104a~104d including a slot 106 communicating with the first channel 101 and a sidewall 110 disposed opposite to the power-converting units 41a~41d and enclose the slot 106.

Each of the receiving portions 104a~104d further includes two protrusions 105 arranged on the bottom and far away from each other. An extending direction of the protrusions 105 is substantially perpendicular to the opening direction of the slots 106. The power-converting module further includes a plurality of electrically conductive terminals 12 and a plurality of fixing members 13, the electrically conductive terminals 12 are connected to the protrusions 105 far away from the power-converting units 41a~41b, and the fixing members 13 are connected to the protrusions 105 close to the power-converting units 41a~41d.

The primary coil 20 is electrically connected to the electrically conductive terminals 12 and is wound on the winding portions 102 in S-shaped, and initial end of the primary coil 20 is connected to one of the electrically connective terminal 12, and a terminal end of the primary coil 20 is connected to the other electrically connected terminal 12, as shown in FIG. 3. The primary coil 20 is a primary winding of the integrated power-converting module.

The main body 100 further includes a plurality of spacers 108 arranged between the second channel 109 and the receiving portions 104b and 104c close to the second channel 109 for spacing the second channel 109 and the receiving portions 104b and 104c.

Figure 5:
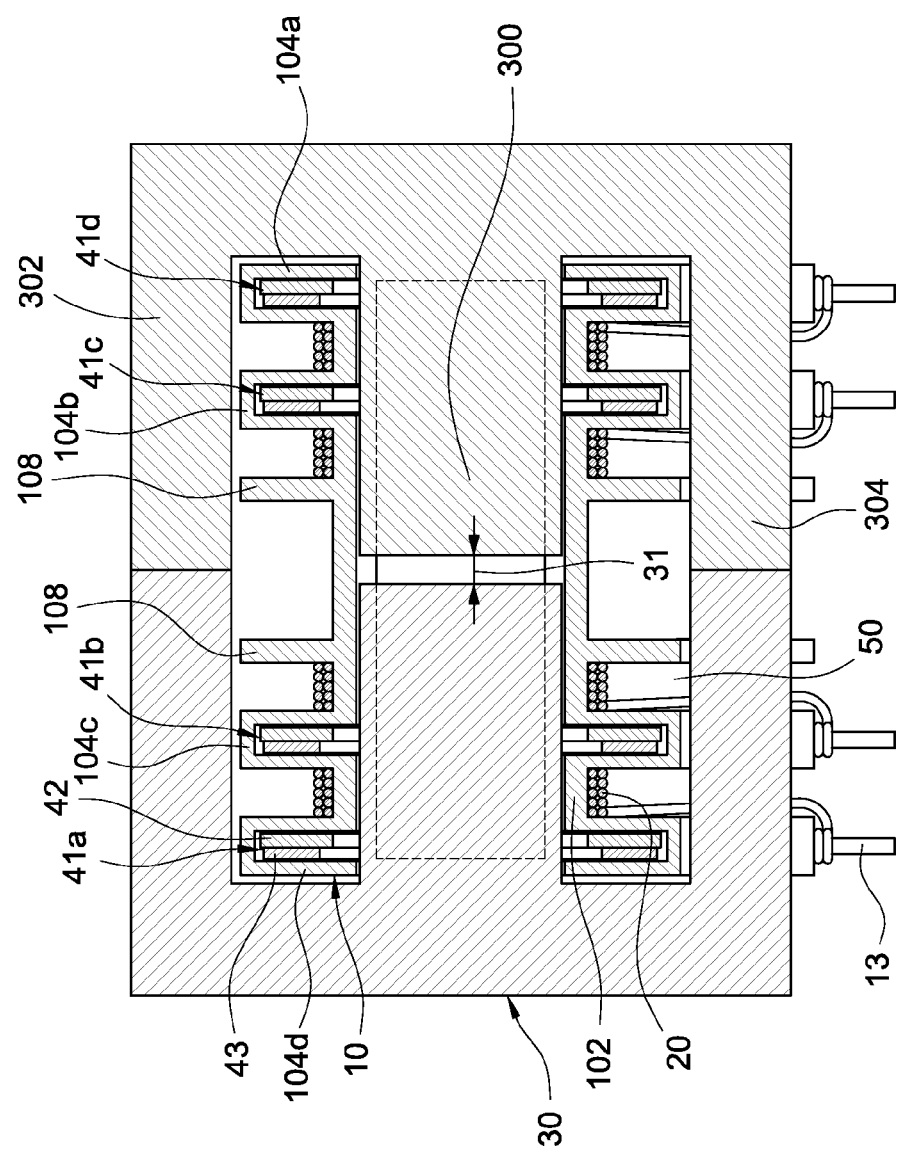
FIG. 5 is a sectional view of the integrated power-converting module along line 5-5 shown in FIG. 3.

The magnetic core assembly 30 is assembled with the bobbin 102 and partially inserted into the first channel 101. The magnetic core 30 can be assembled by two E-shaped magnetic cores, and each magnetic core includes a central led 300 and two lateral legs 302 and 304 arranged at two opposite sides of the central lag 300 and connected thereto. When the magnetic core assembly 30 is assembled with the bobbin 102, the top surfaces of the lateral leg 302 and 304 are contacted with each other, the central leg 300 is received within the first channel 101, and an air gap 31 is formed between the top surface of the central legs 300 and within the second channel 109, as shown in FIG. 5, and then an effect of energy storage is achieved. It should be noted that if the primary coil 20 does not wind on above the air gap 31, an eddy current loss can then be effectively reduce.

Besides, when the magnetic core assembly 30 is assembled with the bobbin 102, there are air passages 50 allowing vapor flowing therethrough exist, and the air passages 50 are formed between the lateral lags 302 and 304 of each of the magnetic core and the main body 100. Thus the integrated power-converting module has a good thermal dissipating effect.

The power-converting units 41a~41d are arranged in a parallel manner and each of the power-converting units 41a~41d includes a circuit board 42, a rectifier 44, and a filter 46.

The circuit board 42 includes a base portion 420 and an extending portion 422 connected to the base portion 420. The base portion 420 and the extending portion 422 are both placed with copper foil, and an electrically connected sheet 43 is placed on the extending portion 422 and attached to the copper foil formed thereon, thus the electrically conductive sheet 43, the rectifier 44, and the filter 46 can be electrically connected to each other. As shown in the FIG. 2, a profile of the base portion 420 is substantially of rectangular, and a plurality of connecting terminals 426 are connected to the bottom of each of the base portions 420.

A penetrating hole 424 is formed on the extending portion 422 so that a profile of the extending portion 422 is ring shape and corresponding to that of the receiving portions 104a~104d, and when the extending portions 422 are inserted into the receiving portions 104a~104d, the penetrating hole 424 of each extending portion 422 is aligned with and communicating with the first channel 101. The extending portions 422 are configured to transit alternative current to the rectifiers 44.

The power-converting unit 41a~41d can further includes the electrically conductive sheets 43 placed on each of the extending portions 423 and attached on the copper foil. A profile of the electrically conductive sheet 43 is corresponding to that of the extending portion 423 and has an opening 430, thus the electrically conductive sheets 43 is of C-shaped. The electrically conductive sheets 43 configured to conduct current can be made of tinned copper for providing a good electrical conduction and thermal dissipation.

In the present invention, the primary coil 20 wound on the winding portion 102, the magnetic core assembly 30 assembled with the bobbin 10, the extending portions 422 where placed with copper foil (and the electrically conductive sheet 43) and inserted into the slots 106 of the bobbin 10, collectively construct the transformer 5 shown in FIG. 1.

The rectifier 44 is placed on one surface of the base portion 420 of the circuit boards 42, and the filter 46 is placed on the other surface of the base portion 420 thereof. The rectifier 44 can be synchronous rectifier composed of four metal-oxide-semiconductor field-effect transistors (MOSFETs). Each of the power-converting units 41a~41d further includes a electrically conductive plate 48 placed on the base portion 420, and the electrically conductive plate 48 and the rectifier 44 are placed on the same surface. The filter 46 is, for example, choke.

The surface of the power-converting unit 41b placed with the filter 46 faces the surface of the power-converting unit 41c placed with the filter 46, which means that the filters 46 of the two power-converting units 41b and 41c close to the second channel 109 face each other, and the length of two filters 46 aforementioned is substantially equal to the width of the second channel 109.

Moreover, the surface of the circuit board 42 of the power-converting unit 41a placed with the rectifier 44 faces the surface of the circuit board 42 of the power-converting unit 41b placed with the rectifier 44. In the other words, two power-converting units 41a and 41b (or 41c and 41d) arranged at the same side of the second channel 109 face each other. In such manner, the integrated power-converting module is compact since the power-converting units 41a~41d are tightly arranged.

Figure 6:
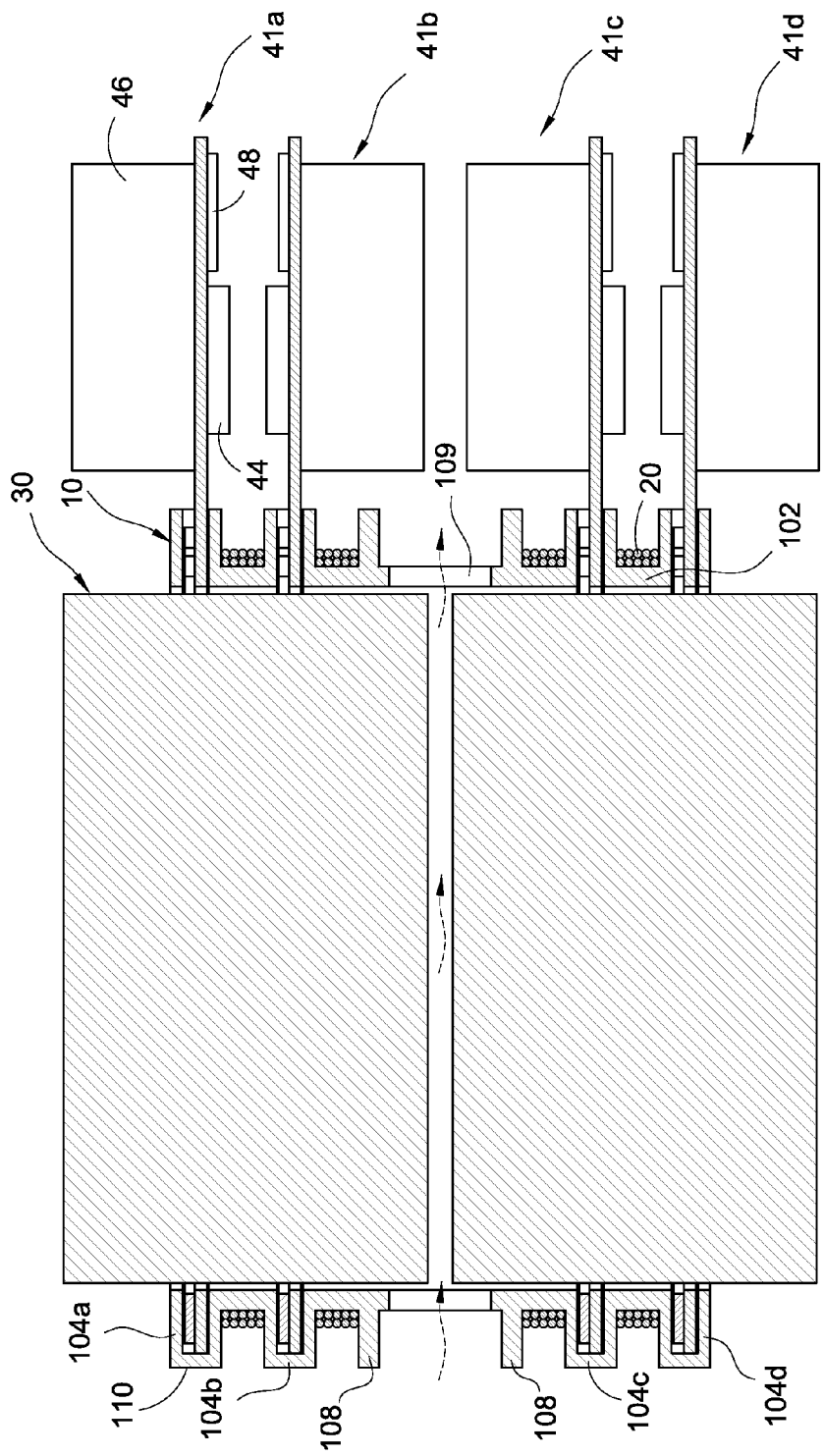
FIG. 6 is a sectional view of the integrated power-converting module along line 6-6 shown in FIG. 3.

The integrated power-converting module of the present invention having circuit diagram shown in FIG. 1 and arrangement shown in FIG. 2 and FIG. 6, which has advantage of compact and eddy current loss and switching loss can be effectively reduced.

The integrated power-converting module can be mounted on a circuit main board, in the other words, the circuit main board is disposed below the integrated power-converting module. The fixing members 13 is inserted into the circuit main board, so that the integrated power-converting module can stand on the circuit main board to prevent the integrated power-converting module from tilt caused by heavy weight. It should be noted that if the integrated power-converting module includes both the fixing members 13 and the electrically conductive terminals 12, the electrically conductive terminals 12 can be disposed at the bottom of the receiving portions 104a~104d, and the primary coil 30 can be connected to the electrically connected terminals 12 and electrically connected to the circuit main board via the electrically connected terminals 12. The fixing members 13 are disposed at the bottom of the receiving portions 104a~104d where the electrically conductive terminal is not disposed, such that the integrated power-converting module can stand firmly on the circuit main board. If the integrated power-converting module only includes the fixing members 13, the fixing members 13 are disposed at the bottom of the receiving portions 104a~104d, and the primary coil 20 wound on the bobbin 10 is directly connected to the circuit main board (by fly line connection). In the practical application, the arrangement of the electrically connective terminals 12 and the mixing member 13 can be adjusted based on the different situations.

The integrated power-converting module of the present invention for outputting multiple direct current electric powers integrates secondary windings (the copper foil or electrically conductive sheet 43 formed on the extending portions 422), the rectifier 44, and the filter 46 into one circuit board 42, which is assembled with the bobbin 10 by inserting the extending portions 422 into the receiving portions 104a~104d respectively. Thus it is compact and easily to manufacture and assemble.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An integrated power-converting module electrically connected to a direct current electric power, the integrated power-converting module comprising:
    a bobbin comprising a main body, a plurality of winding portions, and a plurality of receiving portions, the main body having a first channel, the winding parts and the receiving portion arranged in a staggered manner, each receiving portion having a slot communicating with the first channel;
    a primary coil wound on the winding portions;
    a magnetic core assembly assembled with the bobbin and partially received in the first channel; and
    a plurality of power-converting units arranged in a parallel manner and each of the power-converting units comprising:
        a circuit board having a base portion and an expending portion connected to the base portion, a penetrating hole formed on the expending portion, wherein the extending portions are respectively inserted into the slots, and the penetrating hole is corresponding to and communicating with the first channel;
        a rectifier placed on one of surfaces of the base portion and electrically connected to the circuit board; and
        a filter placed on the other surface of base portion opposite to where the rectifier placed on and electrically connected to the rectifier,
    wherein when the direct current electric power is conducted to the primary coil, the magnetic core assembly generates electromagnetic induction, and a converted power is generated on the power-converting units.

2. The integrated power-converting module in claim 1, wherein the main body further comprising second channel communicating with the first channel and perpendicular to the first channel, wherein the filters of two power-converting units disposed two opposite sides of and most close to the second channel faces each other.

3. The integrated power-converting module in claim 2, wherein the magnetic core assembly comprises two magnetic cores, each magnetic core comprising a central leg, the central legs are inserted into the second channel and an air gap is formed between top surfaces of the central cores and within the second channel, and a plurality of gas passages are formed between the magnetic core assembly, the main body, and the primary coil wound on the winding portions.

4. The integrated power-converting module in claim 2, wherein the winding portions arranged on the opposites sides of the second cannel by a prescribed amount, and the receiving portions arranged in the opposite sides of the second channel by the prescribed amount, and the winding portions and the receiving portions are arranged in a staggered manner.

5. The integrated power-converting module in claim 4, wherein the rectifiers of two adjacent power-converting units arranged at one side of the second channel face each other.

6. The integrated power-converting module in claim 1, wherein each of the converting unit further comprises an electrically conductive plate placed on the base portion of the circuit board, the electrically conductive plate and the rectifier are placed on the same side of the base portion.

7. The integrated power-converting module in claim 2, further comprising a plurality of spacers arranged between the second channel and the receiving portions and parallel to the receiving portions.

8. The integrated power-converting module in claim 1, wherein each of the receiving portion further comprises a side-wall disposed opposite to the power-converting unit and enclosing the slot.

9. The integrated power-converting module in claim 1, further comprising a plurality of fixing members disposed on a bottom of the receiving portions.

10. The integrated power-converting module in claim 1, further comprising an electrically conductive sheet attached on the extending portion of the circuit board.

* * * * *